(12) United States Patent
Kim et al.

(10) Patent No.: US 8,049,904 B2
(45) Date of Patent: Nov. 1, 2011

(54) PRINTER HAVING KEYBOARD FUNCTION, A PRINTING SYSTEM AND PRINTING METHOD USING THE PRINTING SYSTEM

(75) Inventors: Kwang-seuk Kim, Gyunggi-do (KR); Hyun-joon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1241 days.

(21) Appl. No.: 10/745,654

(22) Filed: Dec. 29, 2003

(65) Prior Publication Data

US 2004/0139248 A1 Jul. 15, 2004

(30) Foreign Application Priority Data

Jan. 13, 2003 (KR) .................. 10-2003-0002216
Feb. 21, 2003 (KR) .................. 10-2003-0011122

(51) Int. Cl.
*G06F 3/00* (2006.01)
(52) U.S. Cl. .................. 358/1.1; 358/1.13; 358/1.15
(58) Field of Classification Search .......... 710/9, 305, 710/72, 7–8, 19, 31–47; 713/300, 176; 348/231.9; 395/114; 379/100; 358/257, 1.1, 1.14, 1.15, 358/1.13
See application file for complete search history.

(56) References Cited

U.S. PATENT DOCUMENTS

| | | | | |
|---|---|---|---|---|
| 4,759,053 A * | 7/1988 | Satomi et al. | .............. | 379/100.17 |
| 5,699,494 A * | 12/1997 | Colbert et al. | .............. | 358/1.15 |
| 6,038,665 A * | 3/2000 | Bolt et al. | .............. | 713/176 |
| 6,543,690 B2 * | 4/2003 | Leydier et al. | .............. | 235/451 |
| 6,804,727 B1 * | 10/2004 | Rademacher | .............. | 710/9 |
| 6,868,456 B2 * | 3/2005 | Kim | .............. | 710/10 |
| 6,907,492 B2 * | 6/2005 | Matsuda et al. | .............. | 710/313 |
| 7,046,280 B1 * | 5/2006 | Niikawa | .............. | 348/231.9 |
| 7,102,781 B2 * | 9/2006 | Brown et al. | .............. | 358/1.15 |
| 7,349,112 B2 * | 3/2008 | Kusaka | .............. | 358/1.15 |
| 2002/0032875 A1 * | 3/2002 | Kashani | .............. | 713/300 |
| 2002/0089690 A1 * | 7/2002 | Boyce | .............. | 358/1.15 |

(Continued)

FOREIGN PATENT DOCUMENTS

JP 08-278928 10/1996

(Continued)

OTHER PUBLICATIONS

Korean Office Action for corresponding Korean Appln. No. 10-2003-11122, dated Apr. 25, 2005.

(Continued)

*Primary Examiner* — Chan S Park
*Assistant Examiner* — Allen H Nguyen
(74) *Attorney, Agent, or Firm* — Staas & Halsey LLP

(57) ABSTRACT

A printer, a printing system, and a printing method of the printing system where the printer is provided with a keyboard function, and the printer is connected with a computer via a Universal Serial Bus and includes a key operation section provided with a plurality of keys. The printer further includes: a switching key to select a keyboard function and a printer function; a Universal Serial Bus module to transmit keyboard equipment information and printer equipment information to the computer according to the selection by the switching key; and a key control section to map the keys of the key operation section to those of the keyboard or the those of the printer according to the selection via the switching key. Accordingly, the invention makes printing convenient by directly issuing a command from the printer to the computer to perform a task as requested by a user.

14 Claims, 7 Drawing Sheets

U.S. PATENT DOCUMENTS

| | | | |
|---|---|---|---|
| 2002/0135808 A1* | 9/2002 | Parry | 358/1.17 |
| 2003/0008563 A1* | 1/2003 | Nishio et al. | 439/625 |
| 2003/0074512 A1* | 4/2003 | Klissner | 710/305 |
| 2003/0093599 A1* | 5/2003 | Lou et al. | 710/72 |

FOREIGN PATENT DOCUMENTS

| | | |
|---|---|---|
| JP | 08278928 A * | 10/1996 |
| JP | 2001-030572 | 2/2001 |
| JP | 2001-290612 | 10/2001 |
| KR | 10-2001-0026639 | 4/2001 |

OTHER PUBLICATIONS

Chinese Office Action for Application No. 2004100015249 issued Sep. 9, 2005 (11 pgs).

* cited by examiner

PRINTER HAVING KEYBOARD FUNCTION, A PRINTING SYSTEM AND PRINTING METHOD USING THE PRINTING SYSTEM

CROSS-REFERENCE TO RELATED APPLICATIONS

This application claims the benefit of Korean Patent Application Numbers 2003-2216 and 2003-11122, dated Jan. 13, 2003 and Feb. 21, 2003, respectively, in the Korean Intellectual Property Office, disclosures of which are incorporated herein by reference.

BACKGROUND OF THE INVENTION

1. Field of the Invention

The present invention relates to a printer connected to a computer to perform printing, a printing system, and a printing method using the printing system, and in particular, to a printer connected to a computer via a Universal Serial Bus (USB) port and having a keyboard function, a printing system, and a printing method using the printing system.

2. Description of the Related Art

Generally, computer-readable files prepared by using various computer application programs, for example, word processors, graphics programs etc., including application programs that use different alphabets such as Hangul and Hunmin Jeongeum may be printed on paper by using a printer.

An example of a printing system used to print computer-readable files prepared by using a computer is illustrated in FIG. 1.

As shown in FIG. 1, a printing system comprises a computer 10 and a printer 20. The computer 10 further comprises an application program 12 that contains data, such as documents to be printed, and a printer driver 14 to convert the data to be printed into data capable of being printed by the printer 20. The printer 20 is connected to the computer 10 via a parallel port or a USB port to receive data to be printed transmitted from the printer driver 14, and performs the printing on paper. In addition, the computer 10 is connected to a keyboard 30, through which at least one command can be inputted into the computer 10 in order to execute a specific application program, and to select and print a specific file.

A description of how a user prints a file using the printing system described above is provided in the following paragraphs.

First, a user prepares a document using an application program as exemplified by the application program 12 in FIG. 1. Thereafter, a print command from a menu option of the respective application program 12 is executed in order to print the document. Then, the contents of the document are converted to data capable of being printed via the printer driver 14. Next, the printer driver 14 transmits the print data through a port connected to the printer. Then, the printer 20 prints the document on paper in accordance with the transmitted print data.

However, according to the printing system described above, the printing operation is not performed unless the user uses a print command of the application program to execute the print command via the computer. Therefore, if the user is not familiar with the use of the application program, the user may have difficulty printing. Further, in a case where the computer and the printer are located apart from each other, the user may need to go back and forth between the printer and the computer to check the ready status of the printer and/or fix the printer when the user wants to print. For example, if the printer runs out of printing paper, although the user may issue a print command using the computer, the printing operation would not be performed. In that event, the user is inconvenienced as the user is required to go to the printer, load at least the required amount of paper to complete the printing into the printer, return to the computer, and then issue the print command again. Accordingly, there has been a need to develop a printer having a keyboard function, which allows a command to be issued to the computer directly from the printer.

In addition, in recent times, a variety of portable storage devices have been provided to adapt to the daily changing network circumstances, and appear to meet requests for convenient data maintenance, administration, and mobility.

When a user wishes to print a portable file stored in a portable storage apparatus, the user must first open the file using a compatible program on a computer connected to a printer, and input a print command into the computer. Therefore, the printing operation is prolonged and a user who desires to print the file within a short time is presented with a problem. The user is presented with an additional problem, as the user is required to locate and use a computer to perform the printing operation.

SUMMARY OF THE INVENTION

Accordingly, an aspect of the present invention is provided to solve the above-mentioned problems that exist in the related art. An aspect of the present invention provides a printer having a keyboard function that allows a user to issue a command directly from the printer to a computer to execute the command via the computer, and perform a task desired by the user.

Another aspect of the present invention provides a printing system that prints a file stored in a portable storage using an interface without the need to use a computer, and a printing method using the printing system.

Additional aspects and advantages of the invention will be set forth in part in the description which follows and, in part, will be obvious from the description, or may be learned by practice of the invention.

According to an aspect of the present invention, in order to achieve the above-mentioned objectives, a printer having a keyboard function connected to a computer via a USB port, and having a key operation section with a plurality of keys is provided. The printer further comprises: a switching key to allow selection from a keyboard function and a printer function; a USB module to transmit keyboard equipment information or printer equipment information to the computer according to the selection via the switching key; and a key control section to match the keys of the key operation section to the respective keys of the keyboard or the respective keys of the printer in accordance with the selection via the switching key.

Upon selection of the keyboard function via the switching key, a key to transmit a print command is generated by the key operation section.

In addition, according to another aspect of the printer having a keyboard function, upon selection of a respective keyboard function via the switching key, a key to select and execute a specific file within the computer, and a key to turn off the computer are generated by the key operation section.

According to another aspect of the present invention, in order to achieve the above-mentioned objectives, a printer having a keyboard function is provided where the printer further comprises: a first USB device connected to a computer to transmit printer equipment information to the computer; a printing section to print data transmitted from the computer via the first USB device on a paper; a key operation section to control the printing section; a second USB device connected to the computer to transmit keyboard equipment information to the computer; and a keyboard to input commands into the computer through the second USB device.

Further, according to another aspect of the present invention, in order to achieve the above stated objectives, a printing system is provided that comprises: a portable storage apparatus to store at least one file; and a printer to which the portable storage apparatus and a computer are individually connected, where a predetermined keystroke is generated and outputted to the computer upon input of a selection command to select a print-target-file from the at least one file available based on the connection of the printer to the portable storage apparatus, and the printer prints the print-target-file as a result of a respective keystroke command executed via the computer.

The printer of the printing system further comprises: an interface to provide separate connection of the portable storage apparatus and the computer; a printing section to print the print-target-file; an input section to allow input of the selection command; and a control section to perform control so that the keystroke is generated based on the selection command inputted through the input section and outputted to the computer, and the print-target-file is printed in the printing section based on the result of performing the keystroke command corresponding to the keystroke.

The interface includes a plurality of ports, including at least one USB port.

The printer further comprises a display section to display a file name list, containing at least one file, which the control section controls based on the connection of the portable storage apparatus to the printer.

The control section performs control so that when the selection command is inputted, it is determined whether the print-target-file is an instantly printable file, and upon determining that the print-target-file is an instantly printable file, the printing section is driven and the print-target-file is printed.

According to an aspect of the invention, the instantly printable file has a predetermined file extension.

The printer further comprises a storage section to store a control program that generally controls the printer, which the control section uses to perform control so that the USB port is recognized as a specific port based on the control program.

Further, the at least one USB port includes, a first slave USB port connected to the computer and recognized as a keyboard port based on the control program, and a second slave USB port connected to the computer and recognized as a printer port based on the control program.

The control section executes control comprising: generating and outputting a respective keystroke of a drive command of an upload program stored in the computer via the first slave port upon determining that the print-target file is not an instantly printable file; generating a respective keystroke of an upload command to upload the print-target-file to the computer with the upload program and outputting the upload command of the print-target-file via the first slave USB port when the upload program is driven; generating a respective keystroke corresponding to a drive command of an application program for the print-target-file and outputting, upon loading the print-target-file, through the first slave USB port; generating a respective keystroke corresponding to a file open command to open the print-target-file in the application program when the application program is driven, and outputting through the first slave USB port; and generating a keystroke corresponding to a print command f of the print-target-file when the print-target-file is open, and outputted through the first slave USB port, whereby the print command will be recognized in the application program.

According to yet another aspect of the present invention, a printing method using a printing system is provided comprising: individually connecting a portable storage apparatus, in which at least one file is stored, and a computer to a printer through an interface; inputting a selection command to select a print-target from the at least one file based on the connection to the portable storage apparatus; determining whether the print-target-file is an instantly printable file based on the inputted selection command; and printing the print-target-file based on the result of the determination.

The printing method further comprises: displaying a file name list of the at least one file based on the connection between the portable storage apparatus and the printer when the portable storage apparatus is connected to the printer.

Upon determining that the print-target-file is an instantly printable file, the print-target-file is instantly printed.

According to another aspect of the invention, the operation of connecting the portable storage apparatus and the computer to the printer further comprises the operation of: connecting the computer to a first slave USB port of the interface and recognized as a keyboard port based on a control program controlling the printer; and connecting the computer to a second slave USB port of the interface and recognized as a printer port based on the control program.

Upon determining that the print-target-file is not an instantly printable file, the printing operation of the print-target-file further comprises: generating and outputting a respective keystroke corresponding to a drive command of an upload program stored in the computer through the first slave port; generating a respective keystroke corresponding to an upload command to upload the print-target-file to the computer with the upload program and outputting the keystroke through the first slave USB port when the upload program is driven; generating a respective keystroke corresponding to a drive command of an application file for the print-target-file and outputting the keystroke through the first slave USB port when the print-target-file is uploaded; generating a respective keystroke corresponding to a file open command to open the print-target-file in the application program and outputting the keystroke through the first slave USB port when the application program is driven; generating a respective keystroke corresponding to a print command for the print-target-file and outputting the keystroke through the first slave USB port when the print-target-file is open, whereby the print command will be recognized in the application program; and printing the print-target-file based on the print command.

Accordingly, an aspect of the present invention allows a command to be directly issued from a printer to a computer in order to execute a task requested by a user to provide the user with a convenient printing operation. In addition, an aspect of the invention provides a printing system and a printing operation to print a file stored in a portable storage apparatus using an interface without the need for any operation via access to a computer.

BRIEF DESCRIPTION OF THE DRAWINGS

The above and/or other aspects and advantages of the invention will become apparent and more readily appreciated from the following description of the embodiments taken in conjunction with accompanying drawings, of which.

DETAILED DESCRIPTION OF THE PREFERRED EMBODIMENTS

Figure 1:
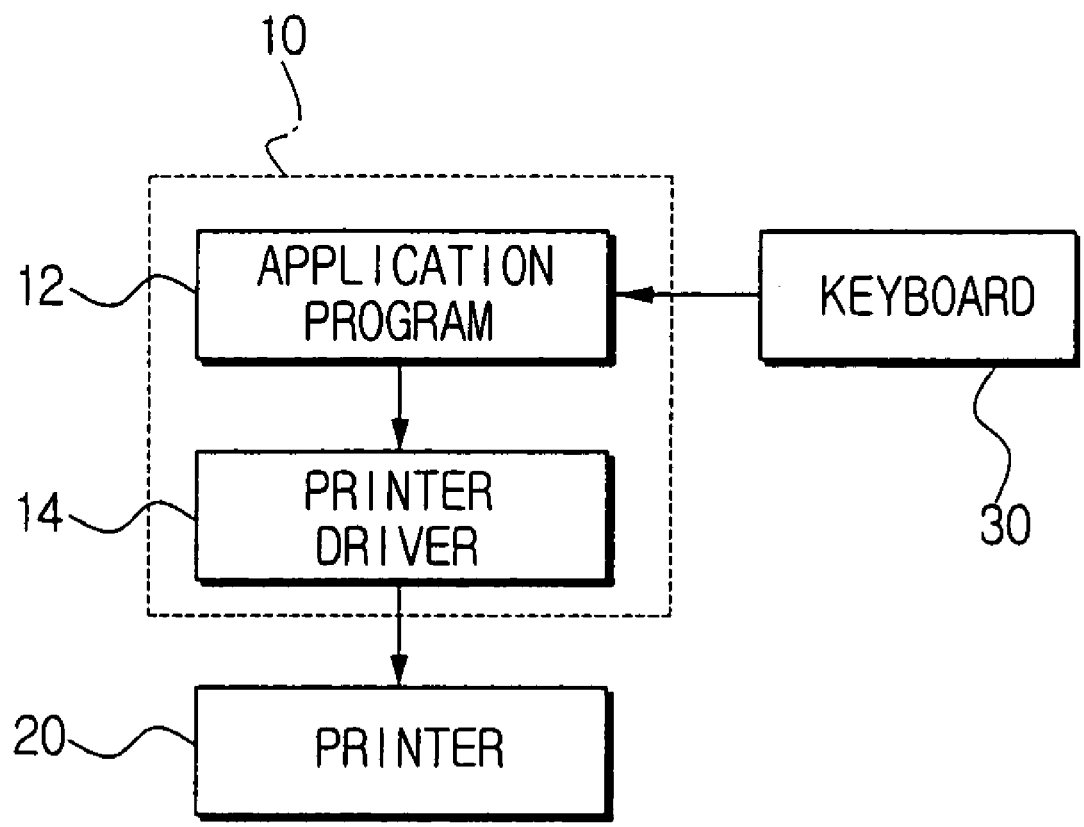
FIG. 1 is a block diagram to illustrate a printing system in which printing is performed by a printer according to the related art.

Reference will now be made in detail to the embodiments of the present invention, examples of which are illustrated in the accompanying drawings, wherein like reference numerals refer to the like elements throughout.

A printer having a keyboard function according to an aspect of the present invention will be described in detail with reference to FIG. 2.

Figure 2:
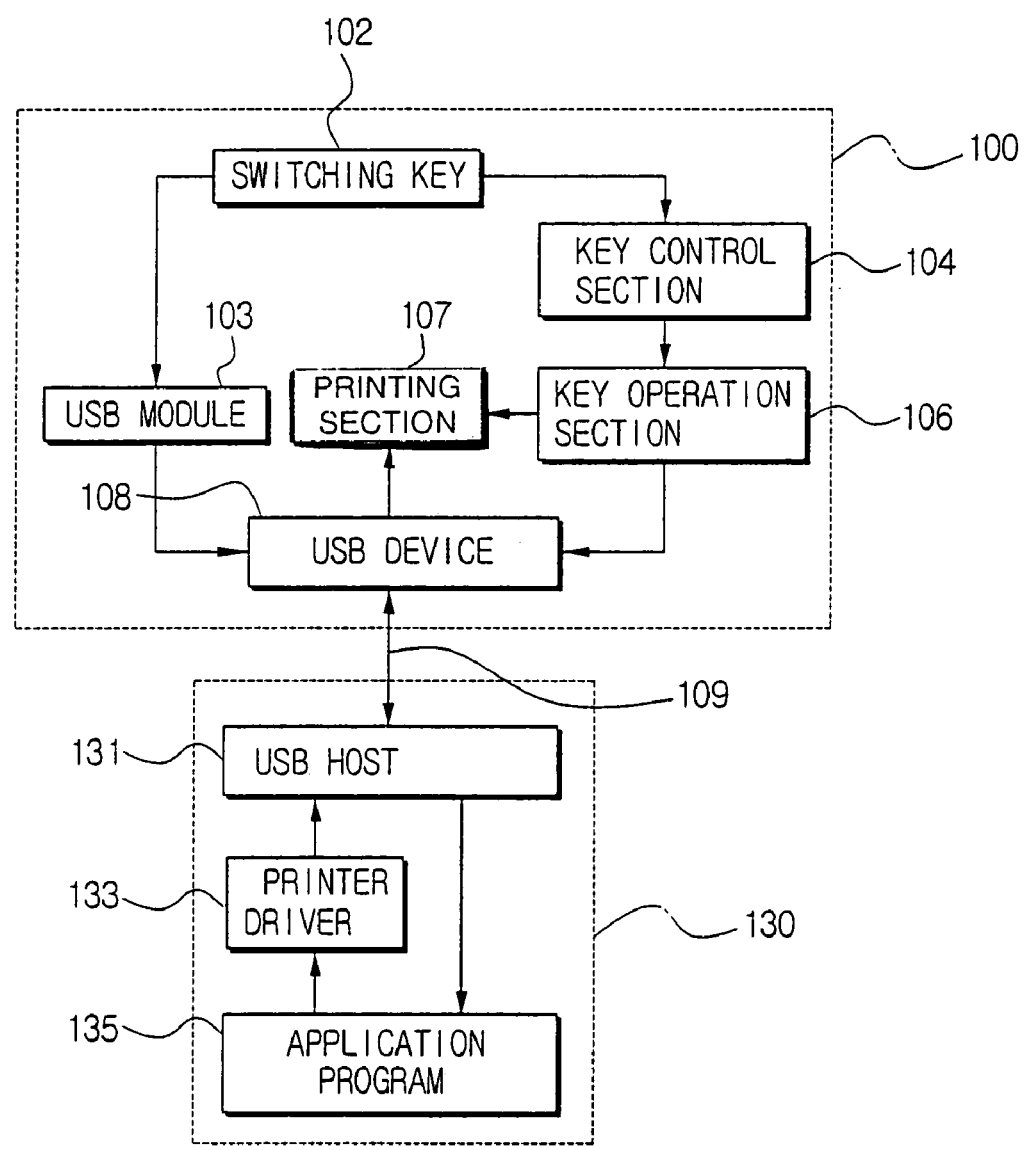
FIG. 2 is a block diagram to illustrate a printer having a keyboard function according to an aspect of the present invention and a computer connected therewith.

Referring to FIG. 2, the printer 100 according to an aspect of the present invention comprises: a switching key 102, a key control section 104, a key operation section 106, a printing section 107, a USB device 108, and a USB module 103.

The switching key 102 is a key that allows a user to make a selection in order for the printer 100 to perform a printer function or a keyboard function, as needed. The term "printer function" refers to a function via which the computer 130 connected to the printer recognizes the printer 100 as a printer, and the key operation section 106 of the printer 100 serves as printer keys to operate the printing section 107 to perform the printing. The term "keyboard function" refers to a function via which the computer 130 connected to the printer 100 recognizes the printer 100 as a keyboard, and the key operation section 106 of the printer 100 serves as keys of the keyboard to allow input of at least one command into the computer 130.

The key control section 104 maps a plurality of keys, which form the key operation section 106, to execute their respective functions according to the selection via the switching key 102. For example, if the printer function is selected by the switching key 102, the key control section 104 maps the key operation section 106 to be used as printer keys to control the printing task performed by the printing section 107. In contrast, if the keyboard function is selected by the switching key 102, the key control section 104 maps the key operation section 106 to be used as keys of a keyboard to input at least one command into the computer 130. For example, a specific key in the key operation section 106 is defined as "Crtl+P" that is used as a shortcut print command in a windows application program. It is possible to map another key, such as a key to execute or terminate the application program, and to map another key such as a key used to move a curser in order to select a specific file.

The key operation section 106 includes a plurality of keys and is generally provided to control the printing task performed by the printer 100. However, if the keyboard function is selected by the switching key 102, the individual keys in the key operation section 106 are mapped by the key control section 104 to perform the functions of some or all of the keys provided on a keyboard.

The printing section 107 performs the printing of a document or the like on paper according to a print command transmitted from the application program 135 of the computer 130. The printing section 107 forms one or more letters or images on the paper while transferring the paper, and discharges the paper when the printing is compete. Printing in the printing section 107 may be performed in any mode, including ink-jet mode, electro-photographic printing, electrostatic printing, etc.

The USB device 108 comprises a USB port, and is connected to a USB host 131 of the computer 130 via a USB cable 109 to exchange signals. That is, if the printer function is selected by the switching key 102, the USB device 108 receives print data from the USB host 131 and transmits the print data to the printing section 107, whereby the printing section 107 will perform the printing. In contrast, if the keyboard function is selected by the switching key 102, the USB device 108 transmits a key signal of the key operation section 106 to the USB host 131, thereby controlling the computer 130.

USB is a specification used to connect computer peripheral devices that is advantageous because the USB specification allows the connection of various peripherals to one port of the USB host 131 of the computer 130, and as a result, allows the convenient use of various peripheral devices. When the USB device 108 is connected to the USB host 131, the computer 130 will have a plug and play (PNP) function, which the computer 130 uses to assign a unique address to the USB device 108 and automatically load a driver suitable for the function of the USB device 108, thereby allowing the USB device 108 to perform its operation. The USB cable 109 comprises four lines, Vdd, Vss, D+, and D−, where the lines Vdd and Vss serve as power supply lines to supply electric power from the USB host 131 to the USB device 108, and the lines D+ and D− serve as data lines to confirm the transmission of one or more data signals and the status of the cable. When a given time has passed after the USB cable 109 is separated from the USB device 108, both data lines D+ and D− turn to low, whereby the computer 130 will recognize that the USB device 108 has been separated. If the USB cable 109 is reconnected and, thus, at least one of the two data lines D+ and D− turns to high, the computer 130 will recognize the reconnection state and performs operations suitable for the connected peripheral devices. Therefore, in the event that a specific signal is transmitted via software to the data lines D+ and D−, it is possible to obtain the same result as when the USB device 108 is reset even if the USB cable 109 is not connected or separated. Accordingly, it is also possible to obtain the same result as when the USB device 108 is reset, as described above, if a specific key of the printer 100 is pressed.

The USB module 103 changes equipment information sent to the USB host 131 so that the computer 130 recognizes the printer 100 connected thereto as a different peripheral device. That is, if the switching key 102 is set to the printer function, the USB module 103 transmits a reset signal and the printer equipment information to the USB host 131, so that the computer 130 recognizes the printer 100 as a printer. Similarly, if the switching key 102 is set to the keyboard function, the USB module 103 transmits a reset signal and keyboard equipment information to the USB host 131, so that the computer 130 recognizes the printer 100 as a keyboard.

The computer 130 connected to the printer 100 with the keyboard function according to an aspect of the present invention, as described above, has the PNP function and comprises a USB host 131 and a printer driver 133. The USB host 131 is connected to the USB device 108 of the printer 100 via the USB cable 109 to exchange signals with the printer 100. When the USB device 108 is connected to the USB host 131, the computer 130 assigns a unique address to the connected device and automatically loads a driver suitable for the device, thereby allowing the USB device 108 to perform its operation. The printer driver 133 converts the data, which is commanded by the computer 130 for printing, into a printing data to be printed by the printer 100, and transmits the converted data to the printer 100.

In the following paragraphs, the operation of the printer having the keyboard function is described according to an aspect of the invention with reference to FIG. 2.

When the need arises to use the printer 100 as a keyboard, a user selects the keyboard function using the switching key 102. If the keyboard function is selected, the USB module 103 receives a signal from the switching key 102 and transmits a reset signal and keyboard equipment information to the USB device 108. Following this, the USB device 108 transmits the reset signal and keyboard equipment information to the USB host 131 through the USB cable 109. Then, the computer 130 recognizes the printer 100 as a keyboard. At this time, the key control section 104 receives the signal of the switching key 102 and maps keys in the key operation section 106 to some or all of the keys of the predetermined keyboard. Then, the keys in the key operation section 106 of the printer 100 are recognized as keys of the keyboard instantly, thereby making it possible for the printer 100 to perform an operation, which is generally performed by a conventional keyboard, using the keys in the key operation section 106. For example, if the user presses a key of the key operation section 106 mapped to a print command key, a signal produced as a result is transmitted to the computer 130 through the USB device 108 and the USB host 131, and the computer 130 performs the printing task the same way as if the print command of the application program 135 was executed with the use of the computer 130.

After the print command is transferred to the computer 130, the switching key 102 is pressed again to select the printer function. Then, the USB module 103 generates and transfers a reset signal and printer equipment information to the USB host 131 through the USB device 108. Then, the computer 130 recognizes the signals as of the printer 100, and the computer 130 also recognizes the printer 100 as being connected. And, the key control section 104 maps again the keys in the key operation section 106 to the printer keys. Therefore, the printing data transmitted from the printer driver 133 of the computer 130 is printed by the printing section 107.

Accordingly, the user is able to set the key operation section 106 of the printer 100 to operate as printer keys or keyboard keys by using the switching key 102.

Figure 3:
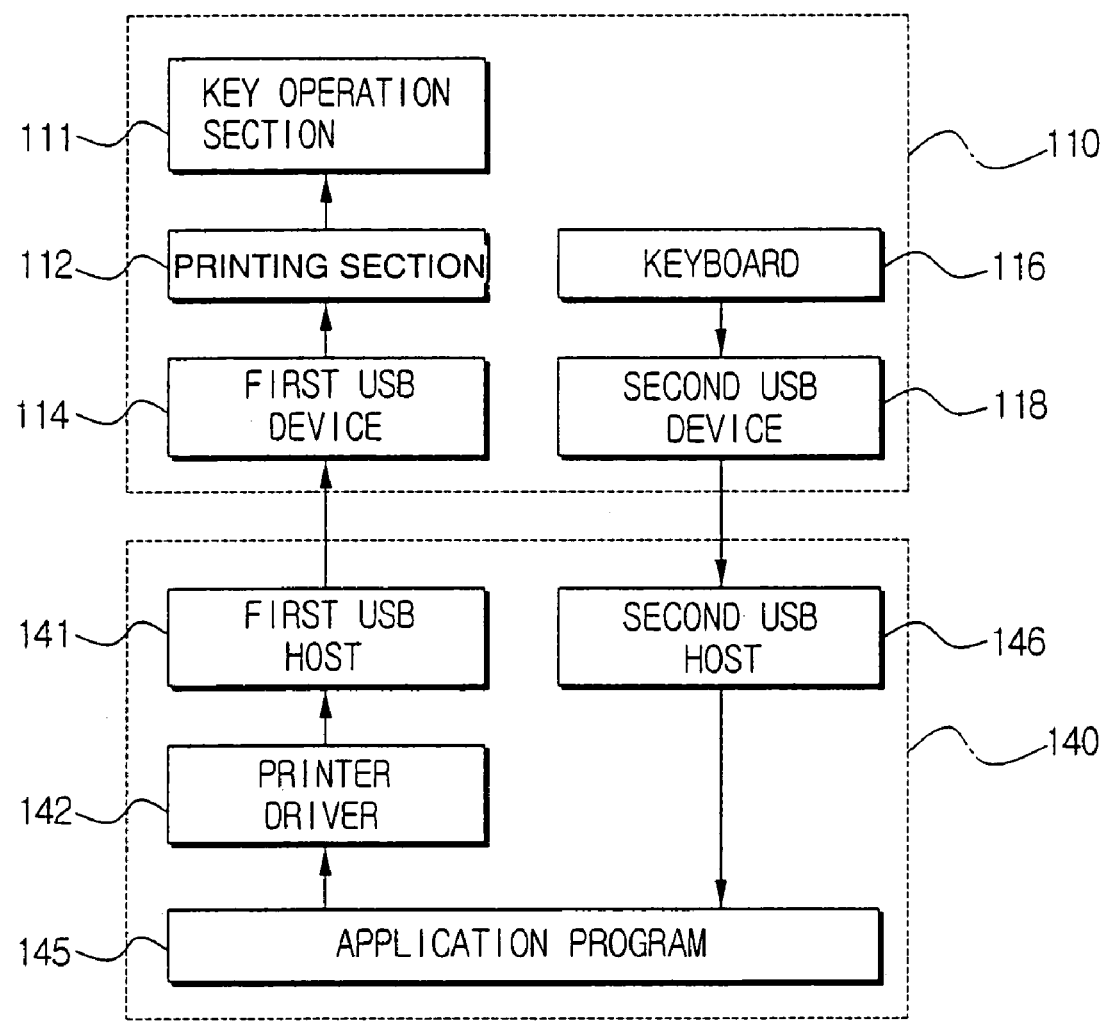
FIG. 3 is a block diagram to illustrate a printer having a keyboard function according to another aspect of the present invention and a computer connected therewith.

Another aspect of the printer with the keyboard function according to the present invention is illustrated in FIG. 3.

As shown in FIG. 3, the printer 110 having the keyboard function comprises: a key operation section 111, a printing section 112, a keyboard 116, a first USB device 114, and a second USB device 118.

The key operation section 111 includes a plurality of keys and is generally provided in order to control the printing task of the printing section 112 of the printer 110.

The printing section 112 performs a printing operation of a document or the like on a paper according to a print command transmitted from the application program 145 of the computer 140. The printing section 112 forms letters or images on the paper while transferring the paper, and discharges the paper when the printing is complete. The printing in the printing section 112 may be performed in any mode including ink-jet mode, electro-photographic printing, electrostatic printing, etc.

The first USB device 114 transmits printer equipment information to the computer 140, and sends print data transmitted from the computer 140 to the printing section 112, so that printing is performed.

The keyboard 116 is a device used to input at least one command to the computer 140, and is provided separately from the key operation section 111 that is provided to control the printing section 112. It is possible to form the keyboard 116 to include some or all of the keys in the conventional keyboard.

The second USB device 118 transmits keyboard equipment information to the computer 140, and transmits a signal generated from the keyboard 116 to the computer 140.

A description of the operation of the printer 110 having the keyboard function according to another aspect of the present invention is discussed in the following paragraphs.

In the event that the printer 110 is used as a keyboard, when the keyboard 116 is pressed, a selected command is transmitted to the computer 140, whereby, a print command may be executed, the application program 145 may be executed or terminated, or a specific file may be selected according to the mapped function of the key pressed.

In addition, in the event that the user wants the print command to be executed using the application program 145, the corresponding data is converted into print data while passing through a printer driver 142, and transmitted into the printing section 112 through a first USB host 141 and a first USB device 114, whereby, printing is performed. When the user presses the keyboard 116 of the printer 110 to execute the print command, the print command is transferred to the computer 140 through the second USB device 118 and a second USB host 146, making it is possible to perform printing in a similar manner as when the print command is executed in the application program 145.

According to an aspect of the present invention, a permanent setting may be made to use the printer function or the key function without the need to repeatedly select the printer function or the keyboard function via the switching key.

Detailed description of the printer 120 that prints a file stored in a portable storage apparatus 200 according to an aspect of the present invention and the printer's printing operation, by way of example, is given with reference to FIGS. 4 to 8.

According to an aspect of the invention, the functions of the printer 120 are not switched via the switching key 102 but are automatically switched to the keyboard function upon connection of the portable storage apparatus 200 to the printer 120.

Figure 4:
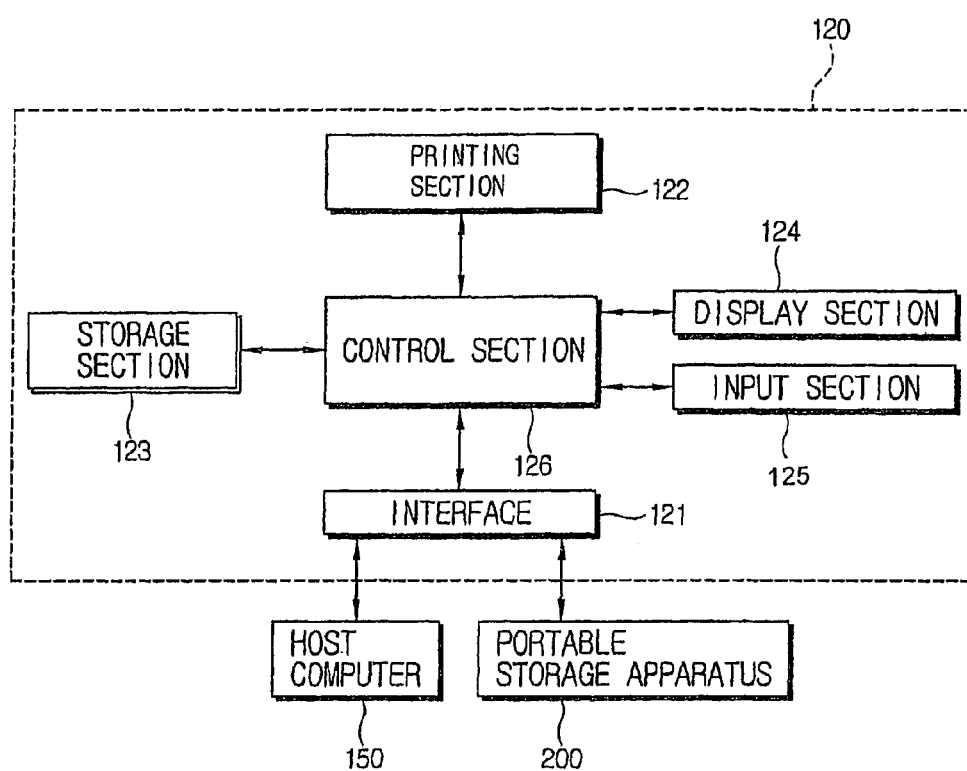
FIG. 4 is a block diagram of a printing system according to an aspect of the present invention.
Figure 5:
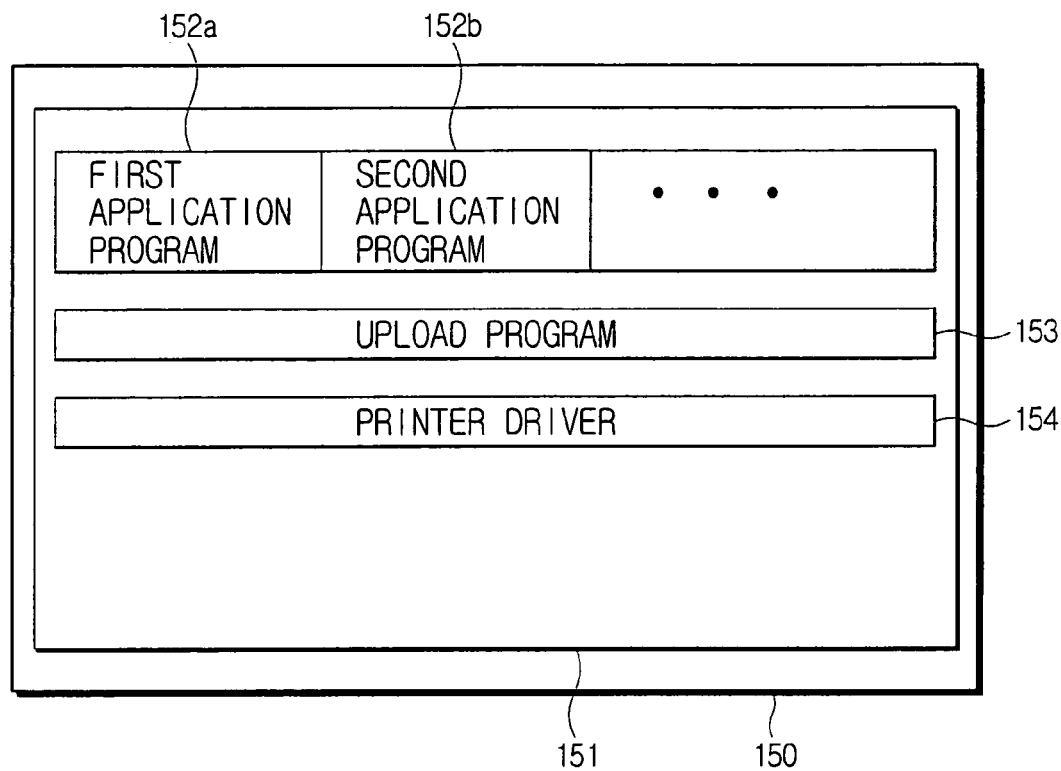
FIG. 5 illustrates an operating system of a conventional computer and various programs stored therein.
Figure 6:
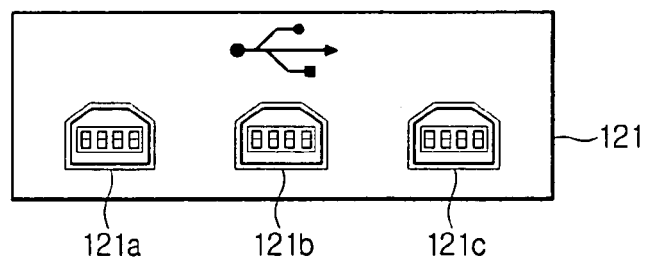
FIG. 6 illustrates an interface according to an aspect of the present invention.

FIG. 4 is a block diagram according to an aspect of the present invention. FIG. 5 illustrates an exemplary operating system (OS) 151 of a computer 150 and various programs stored therein. FIG. 6 illustrates an interface according to an aspect the present invention.

The printing system according to an aspect of the present invention comprises a printer 120 and a portable storage apparatus 200.

The printer 120 comprises an interface 121, a printing section 122, a storage section 123, a display section 124, and a control section 126.

The designation "interface" 121 in FIG. 6 and corresponding text is used to include the USB device 106, a host USB port 121a, a first slave USB port 121b, and a second slave USB port 121c.

The portable storage apparatus 200 is connected to the host USB port 121a.

The computer 150 is connected to the first slave USB port 121b. The operating system 151 of the computer 150 recognizes the first slave USB port 121b as a port for a keyboard by using a control program stored in the storage section 123 of the printer 120. The operating system 151 refers to a program to control and to manage the system of the computer 150.

The second slave USB port 121c is also connected to the computer 150. The operation system 151 of the computer 150 recognizes the second slave USB port 121c as a port for a printer by using the control program stored in the storage section 123.

Accordingly, in this case, the interface is provided with three USB ports. However, the interface may also comprise either the first slave USB port or the second slave USB port only. That is, if the portable storage apparatus is connected to the printer via a different connection technique (e.g., a card slot), the interface of the printer may comprise only two USB ports, i.e., the first slave USB port and the second slave USB port.

The printing section 122 prints a print-target-file under the control of the control section 126.

Generally, the storage section 123 stores a control program to control the printer. The control program controls the aforementioned interface 121. Therefore, the operating system 151 of the computer 150 recognizes the first slave USB port 121b as being connected to the keyboard, and the second slave USB port 121c as being connected to the printer 120.

The display section 124 displays a file name list of one or more files stored in the portable storage apparatus 200 under the control of the control section 126.

An input section 125 comprises up/down shifting keys 125b and 125c, respectively, used to search the print-target-file within the file name list displayed in the display section 124, and a progress key 125a to select the print-target file after identifying the print-target file from the file name list.

The control section 126 controls the printer 120 according to an aspect of the present invention.

When the portable storage apparatus 200 is installed to the host USB port 121a, the control section 126 recognizes the portable storage apparatus 200, and performs control to display the file name list of one or more files stored in the portable storage apparatus 200 on the display section 124.

The control section 126 searches for the print-target-file to be printed from the file name list displayed in the display section 124, and if the progress key 125a is selected, performs a control to load the print-target-file stored in the portable storage apparatus 200 to the printer 120. The print-target-file is temporarily stored in the storage section 123.

The control section 126 determines whether the print-target-file loaded in the printer 120 in response to the selection of the progress key 125a is instantly printable via the printer 120. The description, "a file being instantly printable in the printer 120," refers to a file recognizable by the printer. A recognizable file refers to data that can be printed, meaning, the printing data converted into a print command is recognizable by the printer 200, and when received from the computer 150, converted into the data to be printed by the printer 120. Alternatively, a determination section can be separately provided to the printer 120 in order to make it possible to determine whether the print-target-file is instantly printable with the printer 120.

Upon determination that the print-target file is instantly printable in the printer 120, the control section 126 performs control to drive the printing section 122 to print the print-target file.

Upon determination that the print-target file is not instantly printable in the printer 120, the control section 126 performs control to drive an upload program stored in the computer 150. As part of the control operation, the control section 126 generates a keystroke to be recognized as an upload program driving command by the operating system 151 of the computer 150, and transmits the upload program driving command to the computer 150 through the first slave USB port 121b. Because the first slave USB port 121b is recognized as a port connected to the keyboard by the operating system 151 of the computer 150, the operating system 151 recognizes the upload program driving command as input through the keyboard.

Upon recognition of the driving of the upload program 153 by the operating system, the control section 126 performs control to upload the print-target-file to the computer 150 by the upload program 153. As part of the control operation, the control section 126 generates a keystroke to be recognized as an upload command of the print-target-file by the upload program 153 of the computer 150, and outputs the upload command to the computer 150 through the first slave USB port 121b. The upload program 153 recognizes the upload command of the print-target-file as input through the keyboard based on the reasons described above.

Upon recognition of the print-target-file, the control section 126 performs control to drive an application program corresponding to the print-target-file by the computer 150. As part of the control operation, the control section 126 generates a keystroke to be recognized as an application program driving command by the operating system 151 of the computer 150, and outputs the command to the computer 150 through the first slave USB port 121b. The operating system 151 recognizes the application program driving command as input through the keyboard based on the reasons described above.

As illustrated in FIG. 5, more than one application program, 152a and 152b, may be comprised according to an aspect of the present invention. The application programs are stored in the computer 150, and a variety of application programs may be used based on the compatibility of the print-target file with the application programs.

Upon recognition of the driving of an application program corresponding to the print-target-file, the control section 126 performs control to open the print-target-file from the application program corresponding to the print-target-file. As part of the control operation, the control section 126 generates a keystroke recognizable as a file open command by the application program corresponding to the print-target-file, and outputs the command to the computer 150 through the first slave USB port 121b. The application program recognizes the file open command as input through the keyboard based on the reasons described above.

Upon recognition of the opening of the print-target-file, the control section 126 performs control to print the print-target-file. As part of the control operation, the control section 126 generates a keystroke to be recognized as a file print command of the open print-target-file by the respective application program, and outputs the command to the computer 150 through the first slave USB port 121b. The application program recognizes the application program driving command as input through the keyboard for the reasons described above.

The portable storage apparatus 200 stores one or more files. The stored files are classified into files instantly printable by the printer 120, and files printable through the application program installed on the computer 150.

Figure 7A:
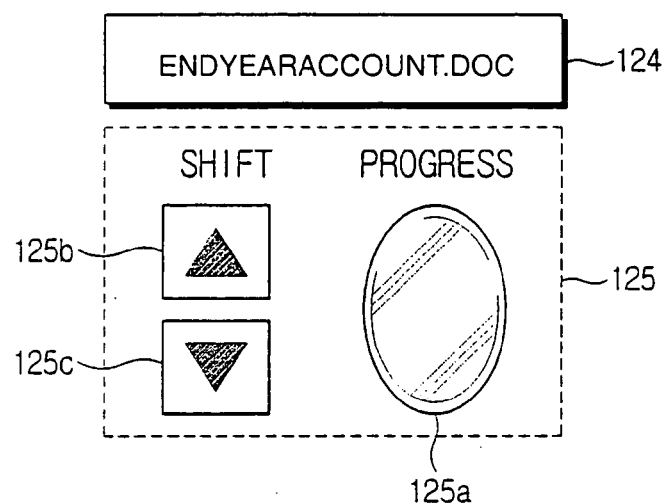
FIG. 7A illustrates an input section and a display section according to an aspect of the present invention using which a given file is displayed in the display section.

FIG. 7A is a drawing to illustrate a display section displaying a file, and an input section according to an aspect of the present invention.

Accordingly, the display section 124 displays a file named "endyearaccount.doc."

When the user wishes to print the "endyearaccount.doc", the user selects the progress key 125a of the input section 125 while the file name is still displayed. However, if the user wishes to print a different file, the user can use the up and/or down shifting keys 125b and 125c, respectively, to search the file. If the "endyearaccount.doc" is not instantly printable via the printer 120, the control section 126 performs one or more predetermined keystroke-outputting operations to drive the printing section 122 to print the print-target-file.

Figure 7B:
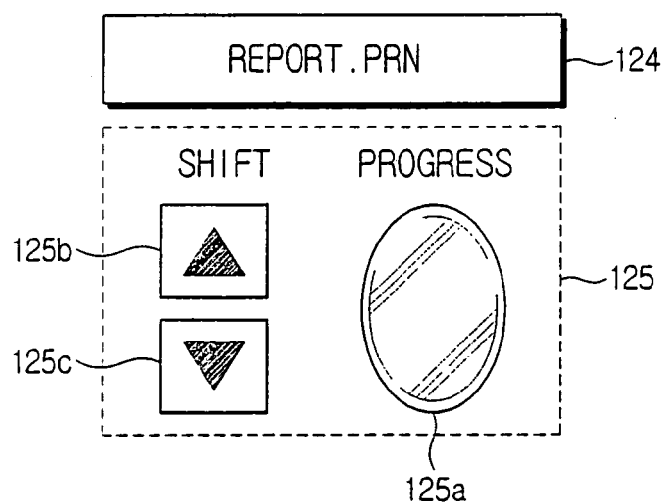
FIG. 7B illustrates another file displayed in the display section.

FIG. 7B is a drawing to show a different file displayed from the one shown in the display section in FIG. 7A. Accordingly, the display section 124 displays a file named "report.prn."

If the user wishes to print the "report.prn", the user selects the progress key 125a of the input section 125 while the name is displayed. And, if the "report.prn" is instantly printable via the printer 120, the control section 126 of the printer 120 drives the printing section 122 to print it.

Figure 8:
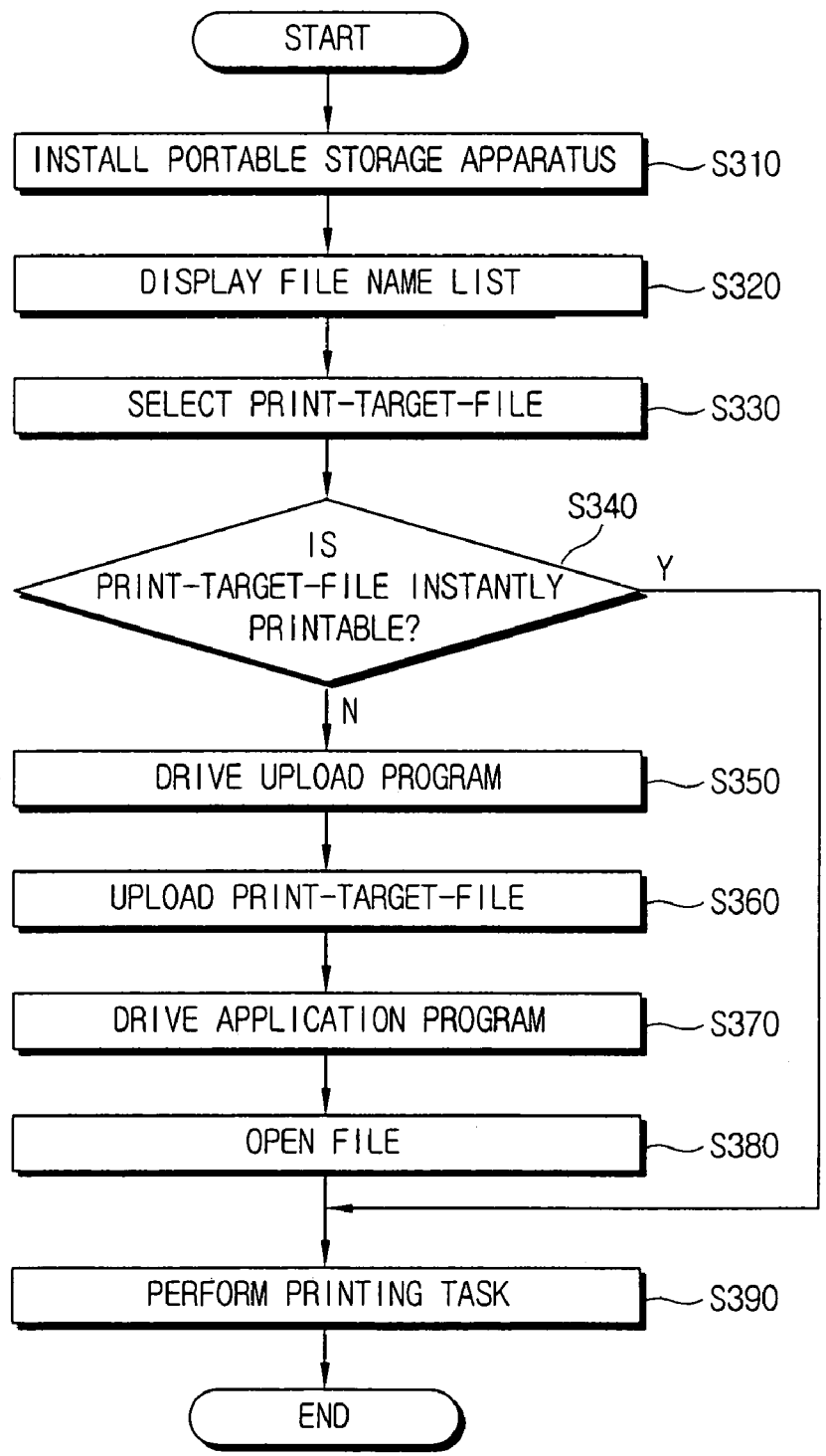
FIG. 8 is a flowchart of a printing method according to another aspect of the present invention.

FIG. 8 is a flowchart to illustrate a printing method according to an aspect the present invention.

As shown in FIGS. 4 to 7, the user first installs the portable storage apparatus 200 to the host USB port 121a of the printer 120 (S310).

The control section 126 recognizes the installation of the portable storage apparatus 200, and displays a file name list of the files stored in the portable storage apparatus 200 to be displayed via the display section 124 (S320).

Then the user searches for a print-target file to be printed by using the up/down shifting keys 125b or 125c. After locating the print-target-file, the user selects the file to be printed via the progress key 125a of the input section 125 while the print-target-file is displayed in the display section 124 (S330).

Then, the control section 126 determines whether the selected print-target-file is instantly printable using the printer 120 (S340). Upon determining the print-target-file is instantly printable, the control section 126 drives the printing section 122 to print the print-target-file.

However, upon determining that the print-target-file is not instantly printable, the control section 126 outputs a keystroke corresponding to the upload program driving command to the computer 150 through the first slave USB port 121b. The upload program 153 of the computer 150 is driven based on the keystroke corresponding to the outputted upload program driving command (S350).

The control section 126 recognizes the upload program 153 being driven and outputs a keystroke corresponding to the upload command for the print-target-file to upload the print-target file via the upload program 153. And, the upload program 153 of the computer 150 uploads the print-target-file to the computer 150 based on the keystroke corresponding to the upload command (S360).

The control section 126 recognizes the print-target-file uploaded and outputs a keystroke corresponding to an application program driving command to the computer 150 in order to drive the application program for the print-target-file. Then, the operating system 151 of the computer 150 drives the application program based on the keystroke corresponding to the application program (S370).

The control section 126 recognizes the application program being driven and outputs a keystroke corresponding to a file open command to the computer 150 in order to open the print-target-file. Then the application program of the computer 150 opens the print-target-file based on the keystroke corresponding to the file open command (S380).

The control section 126 recognizes the file being opened and outputs a keystroke corresponding to a print command of the print-target-file to the computer 150. Then, the application program of the computer 150 performs the printing operation based on the keystroke corresponding to the print command (S390).

The printing task is performed by the printer driver 154 within the computer 150. Because the printing operation is publicly known in the art, detailed description thereof will be omitted. Through this, the user can print the print-target-file without operating the computer 150.

Accordingly, a printer having a keyboard function according to an aspect of the present invention as described above, allows the performance of a task desired by the user by issuing a command directly from the printer to a computer. Therefore, even when the user is not familiar with a specific application program, printing can be simply performed by using the key operation section of the printer. In addition, even if the computer and the printer are located far away from one another, it is possible to reduce unnecessary trips between the computer and the printer, as it is possible to issue a command directly from the printer.

Further, according to the printing system and the printing method thereof of the present invention, a printing task of a file stored in a portable storage apparatus is performed using an interface without any operation in requiring access to the computer, and the printing system and the printing method thereof also allow printing of a print-target-file within a short time.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A printing system connected to a host computer including a printer driver, comprising:
    a portable storage apparatus to store at least one file including a print-target-file; and
    a printer, to which the portable storage apparatus and the computer are individually connected and including a control section, wherein the printer:
        generates at least one predetermined keystroke to be recognized as a command at the host computer, by the control section, and outputs the at least one keystroke to the computer upon input of a selection command to select the print-target-file from among the at least one file,
        determines, by the control section, whether the selected print-target-file is a recognizable file by the printer, the recognizable file being a file converted into data able to be currently printed by the printer, and
        transmits the selected print-target-file to the host computer by a first keystroke recognized as a first command at the host computer and processed into a printable file by the printer driver at the host computer by a second keystroke recognized as a second command at the host computer, when the selected print-target-file is determined to not be a recognizable file by the printer, and prints the print-target-file after the print-target-file is processed into a printable file at the host computer.

2. The printing system according to claim 1, wherein the printer further comprises:

an interface providing separate connection of the portable storage apparatus and the computer;
a printing section to print the print-target-file; and
an input section to allow input of the selection command,
wherein the control section performs control to generate the at least one predetermined keystroke based on the selection command inputted through the input section and outputted to the computer, and prints the print-target-file via the printing section based on execution of a respective keystroke command.

3. The printing system according to claim 2, wherein the interface comprises:
a plurality of ports including at least one Universal Serial Bus port.

4. The printing system according to claim 2, wherein the printer further comprises:
a display section to display a file name list of the at least one file, which the control section controls based on the connection of the portable storage apparatus to the printer.

5. The printing system according to claim 2, wherein the control section performs a control method comprising:
determining whether the print-target-file is an instantly printable file upon input of the selection command, and
upon determining that print-target-file is an instantly printable file, driving the printing section to print the print-target-file.

6. The printing system according to claim 5, wherein the instantly printable file has a predefined file extension.

7. The printing system according to claim 5, wherein the printer further comprises:
a storage section to store a control program that controls the printer, based on which the control section performs control so that the Universal Serial Bus port is recognized as a specific port.

8. The printing system according to claim 7, wherein the interface comprises:
a first slave Universal Serial Bus port connected to the computer and recognized as a keyboard port based on the control program; and
a second slave Universal Serial Bus port connected to the computer and recognized as a printer port based on the control program.

9. The printing system according to claim 8, wherein the first keystroke includes at least one of a first transmission keystroke corresponding to a drive command of an upload program stored in the computer upon determining that the print-target-file is not an instantly printable file, the first transmission keystroke being output through the first slave port, and a second transmission keystroke corresponding to an upload command to upload the print-target-file to the computer with the upload program upon determining that the upload program is driven, the second transmission keystroke being output through the first slave Universal Serial Bus port,
the second keystroke includes at least one of a first process keystroke corresponding to a drive command of an application program for the print-target-file upon determining that the print-target-file is uploaded, the first process keystroke being output through the first slave Universal Serial Bus port, and a second process keystroke corresponding to a file open command to open the print-target-file in the application program upon determining that the application program is driven, the second process keystroke being output through the first slave Universal Serial Bus port; and
a print keystroke corresponding to a print command for the print-target-file upon determining that the print-target-file is open is output through the first slave Universal Serial Bus port, which allows the print command to be recognized in the application program.

10. A printing method using a printing system, comprising:
individually connecting a portable storage apparatus, in which at least one file is stored, and a host computer including a printer driver to a printer including a control section through an interface;
inputting a selection command to select a print-target file from the at least one file based on the connection to the portable storage apparatus;
determining whether the print-target-file is a recognizable file by the printer based on the inputted selection command, the recognizable file being a file converted into data able to be currently printed by the printer; and
generating at least one predetermined keystroke to be recognized as a command at the host computer, by the control section, and outputting the at least one keystroke to the computer, when the selected print-target-file is determined not to be a recognizable file by the printer, the selected print-target-file being transmitted to the host computer by a first keystroke recognized as a first command at the host computer and processed into a printable file by the printer driver at the host computer by a second keystroke recognized as a second command at the host computer when the selected print-target-file is determined to not be a recognizable file by the printer, and printing the print-target-file after the print-target-file is processed into a printable file at the host computer.

11. The printing method according to claim 10, further comprising:
displaying a file name list of the at least one file based on the connection between the portable storage apparatus and the printer when the portable storage apparatus is connected to the printer.

12. The printing method according to claim 10, wherein the print-target-file is instantly printed upon determining that the print-target-file is an instantly printable file.

13. The printing method according to claim 10, wherein the operation of connecting the portable storage apparatus to the printer further comprises:
connecting the computer to a first slave Universal Serial Bus port of the interface and recognized as a keyboard port based on a control program to control the printer; and
connecting the computer to a second slave Universal Serial Bus port of the interface and recognized as a printer port based on the control program.

14. The printing method according to claim 13, wherein the printing the selected print-target-file comprises:
generating and outputting a first transmission keystroke corresponding to a drive command of an upload program stored in the computer through the first slave port;
generating a second transmission keystroke corresponding to an upload command to upload the print-target-file to the computer with the upload program and outputting the second keystroke through the first slave Universal Serial Bus port upon determining that the upload program is driven;
generating a first process keystroke corresponding to a drive command of an application file for the print-target-file and outputting the first process keystroke through the first slave Universal Serial Bus port upon determining that the print-target-file is uploaded;
generating a second process keystroke corresponding to a file open command to open the print-target-file in the application program and outputting the second process keystroke through the first slave Universal Serial Bus port upon determining that the application program is driven;

generating a print keystroke corresponding to a print command for the print-target-file and outputting the print keystroke through the first slave Universal Serial Bus port upon determining that the print-target-file is opened, whereby the print command will be recognized in the application program; and printing the print-target-file based on the print command.

* * * * *

UNITED STATES PATENT AND TRADEMARK OFFICE
CERTIFICATE OF CORRECTION

PATENT NO. : 8,049,904 B2  Page 1 of 1
APPLICATION NO. : 10/745654
DATED : November 1, 2011
INVENTOR(S) : Kwang-seuk Kim et al.

It is certified that error appears in the above-identified patent and that said Letters Patent is hereby corrected as shown below:

Column 14, Line 9, In Claim 10, delete "print-target file" and insert -- print-target-file --, therefor.

Signed and Sealed this
Nineteenth Day of June, 2012

David J. Kappos
*Director of the United States Patent and Trademark Office*